Patented Apr. 27, 1954

2,676,951

UNITED STATES PATENT OFFICE 2,676,951

HIGH SOLIDS SYNTHETIC RUBBER LATEX

Edward A. McCracken and Joseph L. Betts, Jr., Baton Rouge, La., assignors to Standard Oil Development Company, a corporation of Delaware No Drawing. Application February 21, 1952, Serial No. 272,914

15 Claims. (Cl. 260—82.3)

The present invention relates to the manufacture of latex from diolefin-acrylonitrile copolymers and, more specifically, to a concentrated latex of high rubber solids content. The invention will be understood from the following description.

In the rubber art there have been methods for producing concentrated or high solids content latex from natural rubber latex and also such high solids latices have been produced from some of the synthetic rubbers. These latices are of particular value in producing sponge rubber, dipped goods, and coated fibers such as paper and cloth. It has been particularly desired to produce such a latex from diolefin-acrylonitrile rubbers of the type which are highly resistant to attack by oil, but considerable difficulties have arisen in the production of such materials. One of the methods proposed has been to produce an ordinary latex of low solids content and to cream such a latex to produce the high concentration product. Such processes have been developed, but they have great difficulties in respect to control of the creaming process and many of the latices produced in this way have not been of the best quality. Another method is now proposed by which the high concentration latex is produced directly in the polymerization process by greatly reducing the amount of water originally added, but this process has also met with difficulty. It has been found difficult to reach commercial conversions of over 20% in short periods of time due to the fact that the emulsion breaks and the latex coagulates.

Some success has apparently been gained in production of high solids content latex of butadiene-styrene copolymers, but it is recognized that this is a problem of considerably less difficulty than is presented with the nitrile rubbers because of inherent differences in the processes and the products. The styrene monomer is much less water-soluble than the nitrile, and this seems to have a very favorable effect on the particle size and stability of the emulsion produced. Experience indicates that recipes published for the direct polymerization of butadiene-styrene rubbers to high rubber content latices are unsatisfactory for application to nitrile rubbers.

In co-pending application Serial No. 792,854 it is shown that high quality diolefin-nitrile copolymers can be produced in the form of concentrated latices directly in the polymerization process by closely controlling the polymerization procedure within narrow limits and by the combination of several balancing factors such as: (1) narrow limiting ratios of the comonomers; (2) the use of certain specific emulsifying agents of a type capable of inducing polymerization; (3) and the use of certain electrolytes which have the power of increasing particle size in connection with dispersing agents which, in contrast to the emulsifier mentioned above, do not incite polymerization but stabilize the rubber particles which have been increased in size due to the action of the electrolyte. The following is a typical laboratory recipe which gives 57.8% solids (after stripping) at 74% conversion:

Parts by wt./100 pts. of monomer

| | |
|---|---|
| Water | 65 |
| Butadiene | 74 |
| Acrylonitrile | 26 |
| Oleic acid (90% neutralized with KOH) | 0.375 |
| Disperser (sodium salt of the formaldehyde condensation product of beta-naphthalene sulfonic acid) | 1.5 |
| Mercaptan modifier | 0.48 |
| Electrolyte ($Na_4P_2O_7$—$10H_2O$) | 0.5 |
| Catalyst ($K_2S_2O_8$) | 0.25 |

However, when this recipe was translated to pilot plant operation, phase separation and coagulation occurred during the early stages of the process. This could be overcome only by increasing the water content to 125 parts as a result of which the solids content decreased to 40%. Thus it is apparent that the total solids can never reach 50%.

It has now been found that the above difficulties can be overcome and a satisfactory 50% solids content latex can be prepared by direct synthesis in plant operation by charging at the beginning only 60–30% of the total monomers together with all of the other ingredients. By this means a much larger effective water charge is provided which is well above the minimum charge. The process, therefore, proceeds satisfactorily without any phase separation and coagulation. The process is continued in this manner until 30 to 40% conversion is obtained, at which time the remaining 40–70% of the monomers is added and the reaction continued to 95% conversion or above. If desired, the final 40–70% may be added incrementally in as many portions as desired.

It will, of course, be understood that the polymerization is effected in the presence of water and known catalysts, preferably alkali persulfates, such as potassium persulfate, said catalysts being used in the range of 0.2 to 0.3 part by weight per 100 parts of the comonomers. In the same manher it is desirable to employ alkyl mercaptans of 10 to 16 carbon atoms as known in the present art as modifiers of the reaction to prevent too high a degree of polymerization, these modifiers being used in amounts from 0.4 to 1.0 part/100 parts of the comonomers. Furthermore, the temperature is maintained below 50° C., and usually between 30° and 45° C., and the time will be of the order of 10 to 45 hours, which is sufficient in most cases to produce a conversion of at least 70% and preferably in the range of 85 to 100%. It will be understood, of course, that this polymerization takes place while the comonomers are emulsified in water and the emulsion must be agitated and the heat of the reaction withdrawn by suitable cooling means. The agitation must not be too vigorous because coagulation can be brought about in this manner and it has been found that preferably the stirrers have a peripheral speed of 600 to 900 feet per minute.

The combination of the various factors mentioned in the paragraph just preceding are desirable adjuncts to the process and useful to obtain the best results, but they are believed to be largely conventional and are not absolutely essential to produce an operative process. Furthermore, they do not differ widely from the ordinary conditions used in the preparation of dilute latices produced at the present time. For these reasons, it is believed that these steps are not to be considered essential elements of the present invention.

Returning to the essential factors of the present invention, it will be understood that the total comonomers are admixed in proportion of 65 to 85 parts by weight of the conjugated diolefin, preferably butadiene, and 35 to 15 parts by weight of acrylonitrile. The amount of water is initially from say 125 to 150 parts by weight and after 30 to 40% conversion is cut down to 60 to 75 parts by the doubling of the amount of monomers, so that making allowances for some evaporation during subsequent stripping of the unconverted monomers, the product will contain above 45% and preferably above 50% of rubber solids in the form of a concentrated but fluid latex.

The emulsifier, as stated before, is an important feature of the present invention and is limited both in kind and amount, particularly at the initiation of the reaction. The preferred emulsifier is the sodium soap of one of the fatty acids within the range from 10 to 18 carbon atoms such as, for example, sodium oleate, sodium laurate, but other soaps such as the corresponding potassium soaps of the above compound can also be used. The sodium or potassium rosin acid soaps may also be used and mixtures of the types mentioned can also be employed. It is preferred to use soaps which are neutralized to the extent of say 85 to 100% of the theory giving a pH below about 9.5, and these are markedly superior to the fatty acid soaps either above the range of 18 or below 10 carbon atoms. Another type of emulsifier which is useful and can be employed for the present process is an alkali alkyl sulfate. In this case the alkali may be a sodium as well as potassium. The lauryl sulfates are good examples, although the alkyl group may be from decyl to hexadecyl. These various emulsifying agents must be used for best results in quantities which, according to the present art, would be considered too small; for example, from 0.3 to 1.5 parts per hundred parts by weight of the total mixed comonomers, especially at the beginning of the reaction, but the amounts may be increased later with some advantage of increased stability after the conversion has proceeded to 15% or 20%. If more than the amount mentioned above is used, at the start there is considerable tendency toward gelling and excessive viscosity during the run which make control very difficult. The addition of soap after partial conversion, as mentioned before, has the advantage that it will assist in carrying the conversion through to a higher degree than in its absence, and will reduce floc formation.

The third important factor in the present invention is the conjoint use of agents on one hand, to increase particle size, and on the other hand, to prevent flocculation or coagulation. For the first of these functions the agent employed is an electrolyte or brine and it is used in the proportion of about 0.2 to 0.75 part by weight per hundred parts of the comonomers. The preferred salts are the sodium and ammonium salts, but the potassium salt may be used if desired. These salts should be carefully chosen because it is sometimes found that certain specific salts are not so desirable as others, for example, in effecting a partial poisoning of the polymerization or destroying the emulsifying agent. The preferred salts which have been found most satisfactory are the chlorides, sulfates, bisulfites, acetates, dibasic phosphates and pyrophosphates. If the electrolyte is present in higher amounts, actual coagulation will be encountered and the amount of the electrolyte and the disperser mentioned below must be proportioned in conjunction so as to obtain the best result. The preferred disperser is salt of the formaldehyde condensation product of beta naphthalene sulfonic acid, but others may be used such as the potassium and ammonium salts of these condensation products and the alkali metal salts of the fatty acids of 8 to 9 carbon atoms. These latter products must be carefully distinguished from the fatty acid soap emulsifiers mentioned above and they cannot be used interchangeably for both of these purposes. It has been found that the soaps of 8 and 9 carbon atoms while acting as excellent dispersers will not initiate polymerization. The initial disperser concentration should be from about 1.0 to 3.0 part per hundred parts by weight of the total comonomers, at least until 15 or 20% conversion is obtained, and thereafter additional disperser can be added with advantage. It should be repeated that the electrolyte and the disperser are used in conjunction and the actual amounts should be carefully adjusted. Small differences between the different electrolytes will be found within the ranges of the amounts given and they should be adjusted within the range given to obtain the desired degree of conversion, stability and particle size.

Now returning to the process, the water, emulsifier, disperser, electrolyte, diolefin and acrylonitrile are added to the autoclave and the agitator started. The catalyst is then introduced, being careful not to add too much—which has a tendency toward increasing gelation. The charge is then heated to the desired temperature. It is preferred to add the mercaptan in stages, for example, one-half the total at the start, one-quarter after say 10 to 25% of the conversion has been obtained, and the remaining quarter after 45 to 50% of the conversion has been effected. After the conversion reaches 30 to 40%, an amount of monomers is added equal to the initial charge. The process is then continued to a conversion of 70 to 100%, when further reaction is inhibited by addition of hydroquinone or neutralized hydroxyl amine salts, according to the usual procedure. It is also usual to add an oxidation inhibitor for the rubber at this point, such as phenyl beta naphthylamine or ditertiary butyl paracresol or the like. The temperature is then raised in order to flash off unreacted butadiene, and steam or vacuum is employed to vaporize and recover the acrylonitrile. The latex is then obtained in a highly concentrated form, stable and ready for use.

The high solid latex made by the present process, if proper adjustments within the ranges defined are employed, is of excellent quality, not too viscous for use in the processes in which it has the most advantages, for example, in coating fibers, paper, cloth and the like, the manufacture of dipped goods and sponge rubber. The concentration of rubber solids is usually between 45 and 60%.

The following examples will further illustrate the present invention. A series of runs was made at a temperature of 35° C. using the following recipes:

*Table I*

| Recipe | A | B | C | D | E |
|---|---|---|---|---|---|
| Charge, parts by weight: | | | | | |
| Butadiene, initial @ 30-40% conv. | 73 | 71 | 70 | 36.5 / 36.5 | 36.5 / 36.5 |
| Acrylonitrile, initial @ 30-40% conv. | 27 | 29 | 30 | 13.5 / 13.5 | 13.5 / 13.5 |
| Oleic Acid a | 1.35 | 1.35 | 1.35 | 1.35 | 1.35 |
| Daxad #11 | 2.85 | 2.85 | 2.85 | 2.85 | 2.85 |
| Catalyst, K₂S₂O₈ | 0.3 | 0.3 | 0.3 | 0.3 | 0.3 |
| n-dodecyl mercaptan | 0.8 | 0.8 | 0.8 | 1.0 | 1.0 |
| Na₄P₂O₇·10H₂O | 0.5 | 0.5 | 0.5 | 0.15 | 0.15 |
| Water | 100 | 125 | 130 | c 75 | b 130 | a Preneutralized 100% of theoretical with sodium hydroxide.
b Water charge on initial butadiene and acrylonitrile equivalent to 260 parts.
c Water charge on initial butadiene and acrylonitrile equivalent to 150 parts.

The following results were obtained:

*Table II*

PROPERTIES OF HIGH SOLIDS LATICES

| Run No. | Synthesis Method a | Synthesis Recipe | Final Conversion, Percent | Dry Polymer Mooney, 2 Min. | Latex Properties b | | | Coagulate Occurring During Synthesis |
|---|---|---|---|---|---|---|---|---|
| | | | | | Total Solids, Percent | Viscosity, centipoise c | Relative Particle Size d | |
| 1 | R | D | 92 | 14 | 51.2 | 23.5 | 12 | None. |
| 2 | R | D excluding Na₄P₂O₇ | 100 | 57 | 54.5 | Semi-paste | 28 | 1%. |
| 3 | R | E | 98 | 105 | 42.6 | 20 | 114 | Trace. |
| 4 | R | E excluding Na₄P₂O₇ | 98 | 107 | 43.1 | 36 | 138 | 1%. |
| 5 | L | A | 75 | 200+ | 40.8 | 6 | | 10%. |
| 6 | L | B | 84 | 85 | 40.0 | 6 | | None. |
| 7 | R | C (1.4 mercaptan) | 97 | 54 | 42.9 | 14 | 87 | Do. |
| 8 | BNR | C | 95+ | 91 | 39.1 | 7 | 78 | Do. | a R—laboratory pressure bottle polymerization; L—pilot plant polymerization; and BNR—commercial plant polymerization runs.
b Evaluations on latex after stabilization and flashing.
c Determined by Stormer viscometer at the reported total solids.
d Relative particle size is percent light transmission determined in photelometer with reference to conventional latex at 100% transmission. All determinations made at 0.11% total solids. A lower transmission value indicates larger particle size.

The above results show that satisfactory operation can be obtained according to recipe D, where the monomers are added half initially and half after 30-40% conversion (note run No. 1). However, when the electrolyte (in this case sodium pyrophosphate) is omitted, the latex obtained is too viscous (run No. 2). Runs Nos. 3 and 4 are a modification of run 1, in which more water is employed so as to obtain a 40% solids latex. Run No. 5 shows that recipe A cannot be employed in plant operation because of coagulation difficulties. Run No. 6 indicates that recipe A can be operated satisfactorily in the plant provided the water is increased to 125 parts, but at the same time lowering the solids content of the latex to 40%, runs No. 7 and No. 8 are laboratory and commercial runs similar to run No. 6.

Having now particularly described and ascertained the nature of our said invention and in what manner the same is to be performed, we declare that what we claim is:

1. A process for the preparation of latex having a high solids content by the emulsion copolymerization of 65 to 85 parts by weight of a conjugated diolefin and 35 to 15 parts by weight of an acrylonitrile, the improvement which comprises initially mixing 60 to 30% of the monomers, 60 to 130 parts by weight of water and from 0.3 to 1.5 parts by weight, based on the comonomers, of an emulsifier chosen from the group consisting of a sodium soap of a fatty acid containing from 10 to 18 carbon atoms in the molecule, a rosin acid soap and a sodium alkyl sulfate in which the alkyl group contains from 10 to 16 carbon atoms, adding to the emulsion mixture from 0.02 to 0.75 parts by weight, based on the monomers, of an alkali metal salt chosen from the group consisting of chlorides, sulfates, bisulfites, acetates, dibasic phosphates and pyrophosphates and from 1 to 3.5 parts by weight, based on the comonomers, of a dispersing agent selected from the group consisting of an alkali metal salt of the formaldehyde condensation produce of beta-naphthalene sulfonic acid and an alkali metal salt of a fatty acid of 8 to 9 carbon atoms, adding to the mixture a polymerization catalyst and polymerizing the mixture at a temperature below 50° C., until a conversion of 30 to 40% is reached, then adding the remaining 40 to 70% of the monomers, continuing the polymerization and finally arresting the polymerization at between 70 and 100% conversion to polymer and removing remaining unconverted monomers from the mixture.

2. Process according to claim 1 in which the additional 40-70% is added incrementally.

3. A process as claimed in claim 2 wherein the emulsifier is oleic acid neutralized to from 85-95% with sodium hydroxide.

4. A process as claimed in claim 3 wherein the polymerization is carried out at a temperature between 35 and 45° C.

5. A process as claimed in claim 9 wherein the catalyst is potassium persulfate.

6. A process as claimed in claim 4 wherein the amount of catalyst is from 0.2 to 0.6% by weight of the total monomers employed.

7. A process as claimed in claim 5 wherein the amount of the modifier added is from 0.4 to 2.0 per cent by weight of the monomers.

8. Method of making a high solids synthetic rubber latex which comprises forming an emulsion of monomers, butadiene and acrylonitrile in water in the ratio of 50 parts by weight of the monomers to 60 to 130 parts of water in the presence of 0.3 to 1.5 parts by weight based on the monomers of the sodium soap of a fatty acid having 10 to 18 carbon atoms, 0.2 to 0.75 parts by weight based on the monomers of an alkali metal salt chosen from the group consisting of chlorides, sulfates, bisulfites, acetates, dibasic phosphates, and pyrophosphates, and 1.0 to 3.5 parts by weight based on monomers of a disperser selected from the group consisting of an alkali metal salt of the formaldehyde condensation product of beta-naphthalene sulfonic acid and an alkali metal salt of a fatty acid of 8 and 9 carbon atoms, polymerizing the emulsion until 30 to 40% of the monomers are converted, then adding an equal amount of each of the monomers as the original charge, and continuing the polymerization to 70 to 100% conversion.

9. A process as claimed in claim 1 wherein the dispersing agent is a sodium salt chosen from the group consisting of the condensation product of formaldehyde and beta-naphthalene sulfonic acid and the potassium salt of a fatty acid containing 8 to 9 carbon atoms in the molecule.

10. Process for preparation of a latex having a high solids content by the emulsion copolymerization of 65 to 85 parts by weight of a conjugated diolefin and 35 to 15 parts by weight, of acrylonitrile, the improvement which comprises mixing from 32.5 to 42.5 parts by weight, of a diolefin, from 17.5 to 7.5 parts by weight, of acrylonitrile, from 60 to 130 parts by weight, of water and from 0.7 to 1.5 parts by weight, of the comonomers, of an emulsifier chosen from the group consisting of a sodium soap of a fatty acid containing from 10 to 18 carbon atoms in the molecule, a rosin acid soap and a sodium alkyl sulphate in which the alkyl group contains from 10 to 16 carbon atoms, adding to the emulsion mixture from 0.02 to 0.75 parts by weight, based on the monomers, of an alkali metal salt chosen from the group consisting of chlorides, sulfates, bisulfites, acetates, dibasic phosphates and pyrophosphates, and from 1 to 3.5 parts by weight of the copolymerization of a dispersing agent selected from the group consisting of an alkali metal salt of the formaldehyde condensation product of beta-naphthalene sulfonic acid, and an alkali metal salt of a fatty acid of 8 to 9 carbon atoms, adding to the mixture a polymerization catalyst and polymerizing the mixture at a temprature of below 50° C., until conversion of 30 to 40% is reached, then adding additional diolefin and acrylonitrile in the same ratio and amount as originally charged, continuing the polymerization, and finally arresting the polymerization with between 70 and 100% conversion to polymer and removing remaining unconverted monomer from the resulting mixture.

11. The process according to claim 10, in which the alkali metal salt is an ammonium salt.

12. A process as claimed in claim 11 in which the mixture resulting from the polymerization is first heated to remove unconverted diolefins and is then treated with steam or vacuum to remove unconverted acrylonitrile.

13. A process as claimed in claim 12 wherein a polymerization modifier is also added to the mixture.

14. Method of making a high solids synthetic rubber latex which comprises forming an emulsion of monomers, butadiene and acrylonitrile in the ratio of 100 parts by weight of the monomers to 125 to 150 parts of water in the presence of 0.3 to 1.0 parts by weight based on the monomers of potassium oleate, 0.2 to 0.75 parts by weight of sodium pyrophosphate, and from 1 to 2 parts by weight based on the monomers of the sodium salt of the formaldehyde condensation product of beta-naphthalene sulfonic acid, polymerizing the emulsion until 30 to 40% of the monomers are converted, then adding an equal amount of each of the monomers as the original charge and continuing the polymerization to 70 to 100% conversion.

15. Method of making a high solids synthetic rubber latex, which comprises forming an emulsion of 36.5 parts of butadiene, 13.5 parts of acrylonitrile and 75 parts of water in the presence of 1.35 parts by weight based on monomers of potassium oleate, 0.5 part by weight, based on monomers, of sodium pyrophosphate, and 2.85 parts by weight based on monomers of the sodium salt of the formaldehyde condensation product of beta naphthalene sulfonic acid, polymerizing the emulsion until 30 to 40% of the monomers are converted, then adding an equal amount of the monomers as the original charge and continuing the polymerization to over 95% conversion.

References Cited in the file of this patent

UNITED STATES PATENTS

| Number | Name | Date |
| --- | --- | --- |
| 2,554,268 | Rose et al. | May 22, 1951 |
| 2,605,242 | Betts Jr. et al. | July 29, 1952 |